(12) United States Patent
Clark et al.

(10) Patent No.: US 8,783,718 B1
(45) Date of Patent: Jul. 22, 2014

(54) RESTRAINED SHIFT CABLE BRACKET WITH AN E/A RELEASE IN AN ADJUSTABLE STEERING COLUMN

(71) Applicants: Michael W. Clark, Essexville, MI (US); Melvin L. Tinnin, Clio, MI (US)

(72) Inventors: Michael W. Clark, Essexville, MI (US); Melvin L. Tinnin, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 13/803,566

(22) Filed: Mar. 14, 2013

(51) Int. Cl.
*B62D 1/19* (2006.01)
*B62D 1/187* (2006.01)

(52) U.S. Cl.
USPC ...... 280/777; 280/775; 74/473.31; 74/473.32

(58) Field of Classification Search
CPC .......... B62D 1/18; B62D 1/185; B62D 1/187; B62D 1/192; B60K 20/06
USPC ........... 74/493, 473.31, 473.32; 280/775, 777
See application file for complete search history.

(56) References Cited

U.S. PATENT DOCUMENTS

| | | | | |
|---|---|---|---|---|
| 4,805,476 | A * | 2/1989 | Beauch et al. | 74/473.31 |
| 5,954,616 | A * | 9/1999 | Snell et al. | 477/99 |
| 6,327,928 | B1 * | 12/2001 | Bowerman et al. | 74/473.31 |
| 8,065,931 | B1 * | 11/2011 | Marable et al. | 74/493 |
| 2001/0022111 | A1 * | 9/2001 | Ritchie et al. | 74/473.31 |
| 2003/0213673 | A1 * | 11/2003 | Burr et al. | 192/220.2 |
| 2005/0066760 | A1 * | 3/2005 | Takikawa | 74/473.31 |
| 2005/0236252 | A1 * | 10/2005 | Vermeersch et al. | 192/220.2 |
| 2008/0276745 | A1 * | 11/2008 | Jones et al. | 74/473.15 |

* cited by examiner

*Primary Examiner* — Ruth Ilan
(74) *Attorney, Agent, or Firm* — Cantor Colburn LLP

(57) ABSTRACT

An adjustable steering column for a vehicle is provided. The adjustable steering column includes a mounting bracket including at least one arm having a rake slot through which a rake bolt extends. The steering column also includes a column jacket pivotally mounted to the mounting bracket, the column jacket extending along a first axis and pivotable relative to the mounting bracket for adjustment in a rake direction and movable along the first axis for adjustment in a telescope direction, and a shift assembly. The shift assembly includes a shift mechanism secured to the column jacket and a shift cable bracket extending from the shift mechanism, the shift cable bracket having a slot formed therein, a telescope adjustment portion along a first length of the slot, an energy absorbing (E/A) release portion along a second length of the slot, and a raised collar formed in the telescope adjustment portion.

11 Claims, 2 Drawing Sheets

RESTRAINED SHIFT CABLE BRACKET WITH AN E/A RELEASE IN AN ADJUSTABLE STEERING COLUMN

BACKGROUND OF THE INVENTION

The following description relates to a shift cable bracket in an adjustable steering column, and in particular, a shift cable bracket having an energy absorbing (E/A) release, the shift cable bracket extending from a shift mechanism in an adjustable steering column.

A shift mechanism operable to shift gears of a vehicle transmission may be mounted to a steering column. The shift mechanism may include a shift lever that is operable by a vehicle operator to shift gears of the vehicle transmission. The shift mechanism is operably connected to the vehicle transmission by a shift cable. A shift cable bracket may be cantilevered from the shift mechanism. The shift cable bracket acts to restrain a shift cable jacket, in which the shift cable is positioned, near the shift mechanism.

Because the shift cable bracket is cantilevered, i.e., only supported at one end, at the shift mechanism, the shift cable bracket must be made of sufficient strength to restrain the shift cable jacket during movement of the shift cable, for example, when the operator shifts gears of the vehicle transmission via the shift lever. Thus, the shift cable bracket must be made of sufficient thickness and size for this purpose. Because of these requirements, the shift cable bracket may be bulky and/or heavy and require the use of additional material.

An adjustable steering column may be adjustable by an operator in rake and telescope directions when in an unlocked condition. In addition, during a high-impact or crash scenario, relative telescope movement of components of the steering column may be permitted to absorb energy.

Accordingly, it is desirable to provide a shift cable bracket of reduced size and/or weight while maintaining a suitable strength to support the shift cable jacket. In addition, it is desirable to provide an adjustable steering column having an energy absorbing (E/A) function in a high-impact or crash scenario.

SUMMARY OF THE INVENTION

According to an exemplary embodiment of the present invention, there is provided an adjustable steering column for a vehicle. The adjustable steering column includes a mounting bracket configured to be secured to an adjacent portion of the vehicle, the mounting bracket having at least one arm with a rake slot formed therein through which a rake bolt extends. The steering column also includes a column jacket pivotally mounted to the mounting bracket, the column jacket extending along a first axis and pivotable relative to the mounting bracket for adjustment in a rake direction and movable along the first axis for adjustment in a telescope direction. The steering column further includes a shift assembly having a shift mechanism secured to the column jacket, and a shift cable bracket extending from the shift mechanism, the shift cable bracket having a slot formed therein, a telescope adjustment portion formed along a first length of the slot, an energy absorbing (E/A) release portion formed along a second length of the slot, and a raised collar formed in the telescope adjustment portion along a periphery of the slot.

According to another exemplary embodiment of the present invention, there is provided a shift assembly for use with an adjustable steering column in a vehicle, the assembly including a shift mechanism configured to be secured to a column jacket of an adjustable steering column, and a shift cable bracket extending from the shift mechanism, the shift cable bracket having a slot formed therein, a telescope adjustment portion formed along a first length of the slot, an energy absorbing (E/A) release portion formed along a second length of the slot, and a raised collar formed in the telescope adjustment portion along a periphery of the slot.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
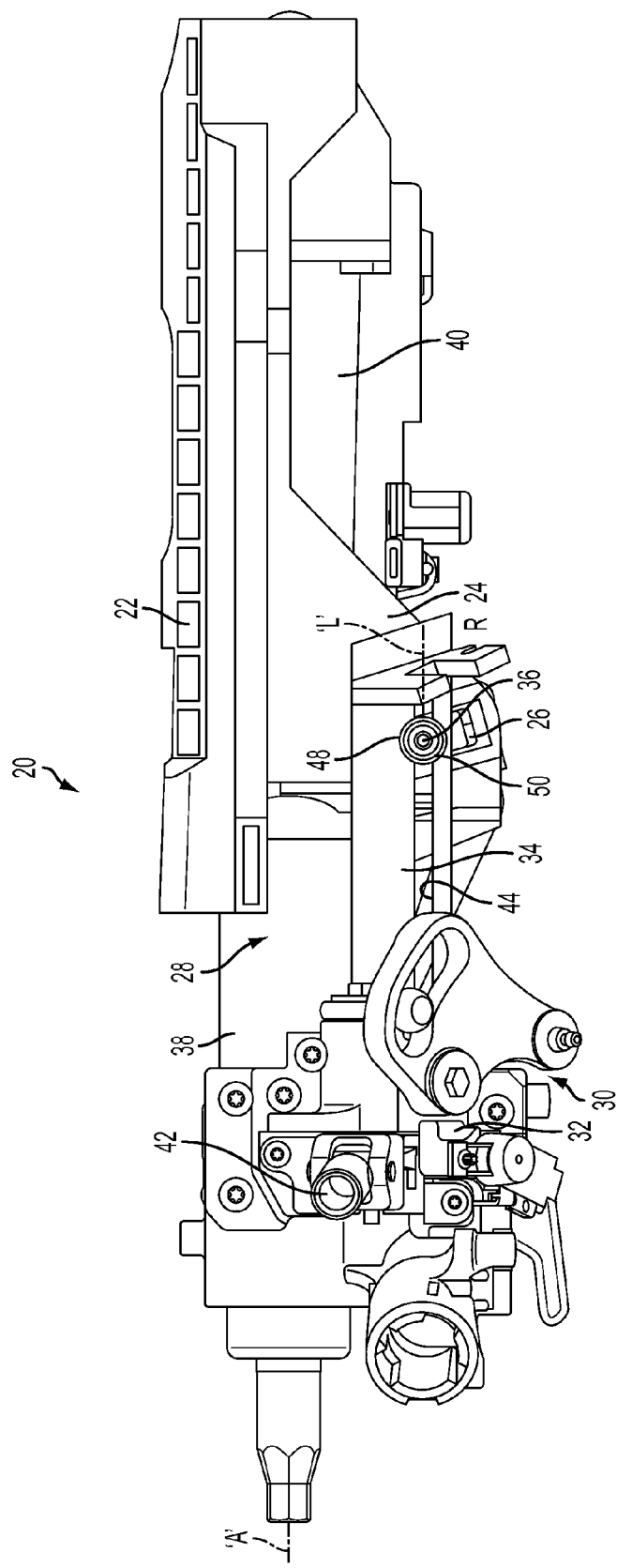
FIG. 1 is a perspective view of an adjustable steering column having a shift cable bracket according to an exemplary embodiment of the present invention.

Referring now to the Figures, where the invention will be described with reference to specific embodiments, without limiting same, FIG. 1 shows an adjustable steering column 20 according to an exemplary embodiment of the present invention.

The adjustable steering column 20 includes a mounting bracket 22 having at least one arm 24 with a rake slot 26 formed therein, a column jacket 28, and a shift assembly 30 comprising a shift mechanism 32 and a shift cable bracket 34.

The mounting bracket 22 is configured to be secured to an adjacent vehicle component (not shown). In an exemplary embodiment, the mounting bracket 22 includes two arms 24 and the column jacket 28 extends between the two arms 24 along a first axis 'A'.

The column jacket 28 is pivotally coupled to the mounting bracket 22 for adjustment in a rake direction. A rake bolt 36 is coupled to the column jacket 28 and is movable with column jacket 28 during adjustment of the column jacket 28 in the rake direction. The rake bolt 36 extends through the rake slot 26 in the at least one arm 24 and is movable within the rake slot 26 during adjustment in the rake direction. In an exemplary embodiment, the column jacket 28 includes an upper jacket 38 and a lower jacket 40 and is adjustable in a telescope direction along the first axis 'A'. Thus, the adjustable steering column 20 is adjustable in the rake and telescope directions.

The shift mechanism 32 is a column mounted shift mechanism. In an exemplary embodiment, the shift mechanism 32 is secured to the column jacket 28, and in particular, to the upper jacket 38. The shift mechanism 32 includes, for example, a shift lever adapter 42. The shift lever adapter 42 is configured to couple to a gear shift lever (not shown) that may be manipulated by an operator of vehicle to shift a gear of a vehicle transmission. A shift cable (not shown) extends between the shift mechanism 32 and the vehicle transmission (not shown) to affect shifting of a gear of the vehicle transmission in response to movement of the gear shift lever (not shown). The shift cable extend through a shift cable jacket (not shown).

The shift cable bracket 34 extends from the shift mechanism 32. The shift cable bracket 34 is configured to support the shift cable jacket extending between the shift mechanism 32 and the vehicle transmission. The shift cable bracket 34 includes a slot 44. The slot 44 extends along a longitudinal axis 'L' that is generally parallel to the first axis 'A'. The shift cable bracket 34 is connected to and supported by the shift mechanism 32 at a first anchor point (not shown, behind shift mechanism 32 in FIG. 1), and is supported adjacent to the mounting bracket 22 at a second anchor point 48 spaced from the first anchor point. In an exemplary embodiment, the shift cable bracket 34 is supported at the second anchor point 48 by the rake bolt 36 and/or a clamping mechanism 50. In addition, the shift cable bracket 34 is movably connected to the mounting bracket 22 at the second anchor point 48. The rake bolt 36 extends through the rake slot 26 on the arm 24 of the mounting bracket 22 and the slot 44 on the shift cable bracket 34.

The clamping mechanism 50 is positioned on an end of the rake bolt 36 extending beyond the mounting bracket 22 and shift cable bracket 34. In an exemplary embodiment, the clamping mechanism 50 is configured to move toward or away from the shift cable bracket 34 to apply or release a clamping force to the shift cable bracket 34 in response to movement of the rake bolt 36. In an exemplary embodiment, the clamping mechanism 50 may include an adjustable fastener, such as a threaded fastener, positioned on an end of the rake bolt 36 adjacent to the shift cable bracket 34. In addition, the clamping mechanism 50 may include at least one washer or spacer positioned between the adjustable fastener and shift cable bracket 34. The washer or spacer may be, for example, a friction disk, spring disk, mechanical spacer, or the like.

The rake bolt 36 is movable in response to rotation of an operating lever (not shown). The operating lever is rotated to actuate the adjustable steering column 20 between a locked condition where adjustment of the steering column 20 in rake and telescope directions is restricted and an unlocked condition where adjustment of the steering column in the rake and telescope directions is permitted. In the locked condition, the clamping mechanism 50 applies the clamping force to the shift cable bracket 34. In the unlocked condition, the clamping force is released from the shift cable bracket 34.

Figure 2:
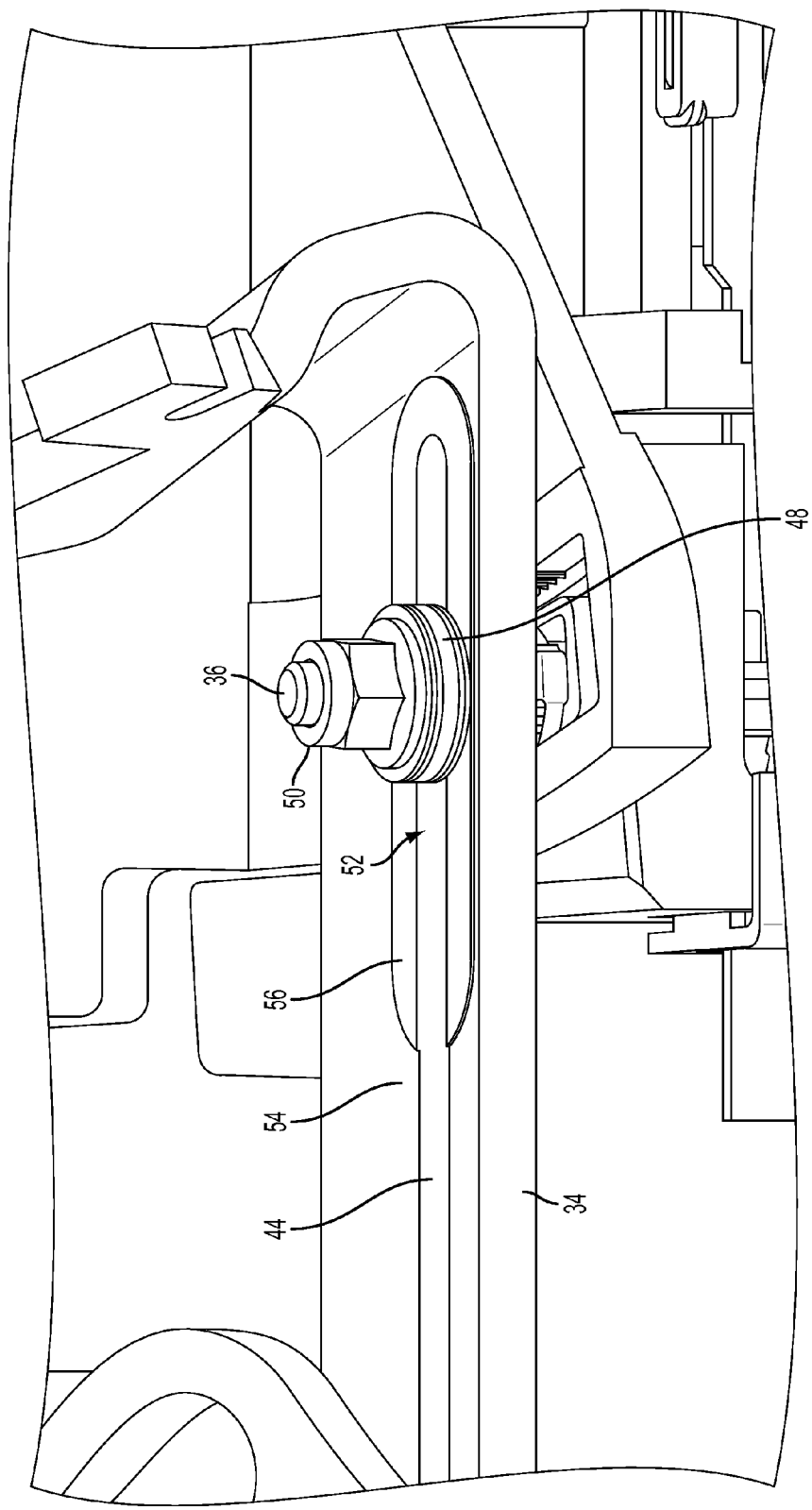
FIG. 2 is a perspective view of the shift cable bracket according to an exemplary embodiment of the present invention.

FIG. 2 is a perspective view of the shift cable bracket 34. Referring to FIG. 2, the shift cable bracket 34 includes a telescope adjustment portion 52 extending along a first length of the slot 44 and an E/A release portion 54 extending along a second length of the slot 44, serially arranged relative to the telescope adjustment portion 52. The telescope adjustment portion 52 includes a raised collar 56 extending about a periphery of the slot 44. In an exemplary embodiment, the raised collar 56 extends along the first length of the slot. Thus, the telescope adjustment portion 52 includes an area of increased thickness at the raised collar 56, relative to the E/A release portion 54.

In operation, and with reference to FIG. 1, the adjustable steering column 20 may be adjusted in the rake and telescope directions by rotating an operating lever (not shown) to an unlocked position. Rotation of the operating lever to the unlocked position causes the rake bolt 36 to move, either linearly along its axis, or rotationally, in such way that the clamping force applied by the clamping mechanism 50 is released from the shift cable bracket 34. With the clamping force released, the column jacket 28 may be pivoted relative to the mounting bracket 22 to adjust the steering column 20 in the rake direction. During adjustment in the rake direction, the rake bolt 36 moves within the rake slot 26. The shift mechanism 32 moves together with the column jacket 28 in the rake direction. In addition, the shift cable bracket 34 moves with the shift mechanism 32 and column jacket 28. The shift cable bracket 34 is supported by the rake bolt 36 at the second anchor point 48 in this unlocked condition.

During telescope adjustment of the steering column 20, the shift mechanism 32 and shift cable bracket 34 move relative to the mounting bracket 22 together with upper jacket 38 along the first axis 'A'. The slot 44 in the shift cable bracket 34 allows the shift cable bracket 34 to move linearly relative to the mounting bracket 22 and rake bolt 36 during telescope adjustment. In an exemplary embodiment, the shift cable bracket 34 moves relative to the rake bolt 36 with the rake bolt 36 positioned in the telescope adjustment portion 52 of the shift cable bracket 34. That is, during telescope adjustment with the steering column 20 in an unlocked condition, the shift cable bracket 34 moves relative to the rake bolt 36 and clamping mechanism 50, with the rake bolt 36 and clamping mechanism 50 remaining positioned in the slot 44 in the telescope adjustment portion 52.

The steering column 20 may be placed in a locked condition by rotating the operating lever to the locked position. In the locked position, the rake bolt 36 moves, for example, in linear direction along its length to bring the clamping mechanism 50 toward the shift cable bracket 34. In an exemplary embodiment, the clamping mechanism 50 is moved toward, and into engagement with, the raised collar 56 in the telescope adjustment portion 52. Thus, the rake bolt 36 moves the clamping mechanism 50 to apply the clamping force to the shift cable bracket 34 at the raised collar 56 and, in turn, the mounting bracket 22.

Referring to FIGS. 1 and 2, in the locked condition, the applied clamping force results in a friction force between the clamping mechanism 50 and raised collar 56, and in some exemplary embodiments, between the shift cable bracket 34 and the mounting bracket 22, that is sufficient to restrict adjustment of the steering column 20 in the rake and telescope directions. In particular, the clamping force, and thus, the friction force, is sufficient to restrict relative movement between the shift cable bracket 34 and the mounting bracket 22. In addition, in the locked condition, the shift cable bracket 34 is supported by the rake bolt 36 and clamping mechanism 50 at the second anchor point 48.

It is understood, however, that telescope movement may be permitted in high-impact or crash scenarios, where a force is applied to the column jacket 28 with a component along the first axis 'A' that is sufficient to overcome the clamping force applied by the clamping mechanism 50. In an exemplary embodiment, with the steering column in the locked condition, where a force is applied along the first axis 'A' that overcomes the clamping force, the shift cable bracket 34 moves relative to the rake bolt 36 and clamping mechanism 50 to absorb energy.

Referring to FIG. 2, with the steering column 20 in the locked condition, the clamping force includes a first clamping force applied to the shift cable bracket 34 at the raised collar 56 in the telescope adjustment portion 52 by the clamping mechanism. The clamping force may further include a second clamping force applied by the clamping mechanism 50 in the E/A release portion 54 as well. The first clamping force is greater than the second clamping force due to the increased thickness of the telescope adjustment portion 52 at the raised collar 56. Accordingly, a friction force between the clamping mechanism 50 and the raised collar 56 in the telescope adjustment section 52 is greater than a friction force between the clamping mechanism 50 and the shift cable bracket 34 in the E/A release portion 54 with the steering column in locked condition and thus, is more resistant to relative movement.

During a high-impact or crash scenario that causes telescope movement in the steering column 20, the shift cable bracket 34 moves relative to the rake bolt 36 and clamping mechanism 50 in the direction of the first axis 'A' with the clamping mechanism 50 applying the first clamping force to the raised collar 56. Here, telescope movement is resisted by the friction force between the raised collar 56 and the clamping mechanism 50. With continued telescope movement of the shift cable bracket 34 in the direction of the first axis 'A' during a high-impact or crash scenari, the rake bolt 36 and the clamping mechanism 50 become positioned in the E/A release portion 54. With the rake bolt 36 and clamping mechanism 50 in the E/A release portion 54, telescope movement is resisted to a lesser degree than in the telescope adjustment portion 52 due to the reduced second clamping force, and thus, reduced friction force. That is, telescope movement of the shift cable bracket 34 during a high-impact or crash scenario goes through a first length where telescope movement is resisted and energy is absorbed in the telescope adjustment portion 52 and a second length where telescope movement is resisted to a lesser degree in the E/A release portion 54. Thus, the shift cable bracket 34 may be released at an end of telescope travel along the telescope adjustment portion 52.

In the exemplary embodiments above, the shift cable bracket 34 is supported at two anchor points, at the shift mechanism and the second anchor point 48. Accordingly, an axial and radial stiffness of the shift cable bracket 34 may be increased, while being formed of a thinner gauge than traditional cantilevered shift cable brackets. In addition, telescope movement of the shift cable bracket 34 during high-impact or crash scenarios goes through an energy absorbing stage during movement in the telescope adjustment portion 52 and a collapse stage where the shift cable bracket 34 is released during movement in the E/A release portion 54.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustable steering column for a vehicle, the steering column comprising:
   a mounting bracket configured to be secured to an adjacent portion of the vehicle, the mounting bracket including at least one arm having a rake slot formed therein through which a rake bolt extends;
   a column jacket pivotally mounted to the mounting bracket, the column jacket extending along a first axis and pivotable relative to the mounting bracket for adjustment in a rake direction and movable along the first axis for adjustment in a telescope direction; and
   a shift assembly comprising:
      a shift mechanism secured to the column jacket; and
      a shift cable bracket extending from the shift mechanism, the shift cable bracket having a slot formed therein, a telescope adjustment portion formed along a first length of the slot, an energy absorbing (E/A) release portion formed along a second length of the slot, and a raised collar formed in the telescope adjustment portion along a periphery of the slot.

2. The adjustable steering column of claim 1, wherein the slot extends along a longitudinal axis parallel to the first axis.

3. The adjustable steering column of claim 2, wherein the rake bolt extends through the rake slot of the mounting bracket and the slot of the shift cable bracket.

4. The adjustable steering column of claim 3, wherein the shift cable bracket is movable relative to the rake bolt in a telescope direction.

5. The adjustable steering column of claim 3, further comprising a clamping mechanism positioned on the rake bolt adjacent to the shift cable bracket.

6. The adjustable steering column of claim 5, wherein the clamping mechanism is configured to apply a first clamping force to the raised collar in the telescope adjustment portion and a second clamping force in the E/A release portion, the first clamping force greater than the second clamping force.

7. The adjustable steering column of claim 5, wherein the shift cable bracket is movably connected to the mounting bracket by the rake bolt and clamping mechanism.

8. The adjustable steering column of claim 3, wherein the rake bolt moves within the rake slot during adjustment in a rake direction.

9. The adjustable steering column of claim 1, wherein the column jacket includes an upper jacket and a lower jacket, the shift mechanism secured to the upper jacket.

10. A shift assembly for use with an adjustable steering column in a vehicle, the assembly comprising:
    a shift mechanism configured to be secured to a column jacket of an adjustable steering column; and
    a shift cable bracket extending from the shift mechanism, the shift cable bracket having a slot formed therein, a telescope adjustment portion formed along a first length of the slot, an energy absorbing (E/A) release portion formed along a second length of the slot, and a raised collar formed in the telescope adjustment portion along a periphery of the slot.

11. The shift assembly of claim 10, wherein the slot extends along a longitudinal axis.

* * * * *